United States Patent [19]

Ratner

[11] Patent Number: 5,684,826
[45] Date of Patent: Nov. 4, 1997

[54] RS-485 MULTIPOINT POWER LINE MODEM

[75] Inventor: Boris Ratner, Palo Alto, Calif.

[73] Assignee: ACEX Technologies, Inc., Oakland, Calif.

[21] Appl. No.: 590,035

[22] Filed: Feb. 8, 1996

[51] Int. Cl.[6] .................................................. H04B 1/00
[52] U.S. Cl. ............... 375/222; 340/310.01; 395/200.2; 364/238.5
[58] Field of Search .................... 340/310.01–310.08, 340/825.06–825.18, 870.02–870.03; 375/222–223; 395/200.2

[56] References Cited

U.S. PATENT DOCUMENTS

| | | | |
|---|---|---|---|
| 4,510,611 | 4/1985 | Dougherty | 375/8 |
| 4,692,761 | 9/1987 | Robinton | 340/825.01 |
| 5,179,376 | 1/1993 | Pomatto | 340/870.02 |
| 5,452,344 | 9/1995 | Larson | 379/107 |
| 5,491,463 | 2/1996 | Sargeant et al. | 340/310.01 |
| 5,539,375 | 7/1996 | Atherton | 340/310.01 |
| 5,554,968 | 9/1996 | Lee | 340/310.01 |
| 5,581,229 | 12/1996 | Hunt | 340/310.02 |

OTHER PUBLICATIONS

Abraham, K.C. and Roy, S., "A Novel High-Speed PLC Communication Modem," IEEE Transactions on Power Delivery, vol. 7, No. 4 (Oct. 1992), pp. 1760–1768, 1992.
"Neuron Chip RS–485 Transceiver," Promotional Literature, Echelon Corporation, Dec. 1991.
"LTS–10 SLTA Core Module, Model 65200," Promotional Literature, Echelon Corporation, 1993, pp. 1–12.
R. Gershon, D. Propp and M. Propp, "A Token Passing Network for Powerline Communications," IEEE Transactions on Consumer Electronics, vol. 37, No. 2, May 1991, pp. 129–134.

Nicholas Vun, C. T. Lay, and B. S. Lee, "A Power LAN for Telecoummunication Power Supply Equipment," IEEE Tencon '93, Beijing, 1993, pp. 24–27.
"High Cost of Wiring Sparks Wireless LAN Alternatives," Computer Technology Review, vol. XIV, No. 3, Mar. 1994.
"LAN Operates over Existing Power Lines," Design News, Jan. 23, 1989.
"AN192 Powerline Network Communications Module," Product Specification Sheet, Adaptive Networks, Inc. 1988.
"Data Transmission without Wire," Material Handling Engineering, Oct. 1993.
"Spread Spectrum Carrier Technology," Promotional literature, Intellon Corporation, prior to 1996.

*Primary Examiner*—Lance Leonard Barry
*Attorney, Agent, or Firm*—Elliot B. Aronson

[57] ABSTRACT

A modem enabling multi-point networks to be established over power lines emulating the RS-485 electrical interface standard for data transmissions. The modem includes a data terminal interface unit for exchanging data with a data terminal, a power line interface unit for placing data onto and taking data off of the power line, and a parallel I/O interface connecting the two units and including a network processor implementing a network protocol for sending and receiving messages. The parallel I/O interface provides for very fast data transfers across the parallel I/O interface compared with the rates at which the modem receives data from the power line and from the data terminal. In addition, at least the outgoing data is transferred across the parallel I/O interface in a form intermediate between the serial RS-485 data stream from the data terminal and the message packet that is sent over the power line by the power line interface unit. The parallel I/O interface facilitates reliable and flexible transfers compensating for delays and uncertainties in the transmission rate over the power line.

6 Claims, 2 Drawing Sheets

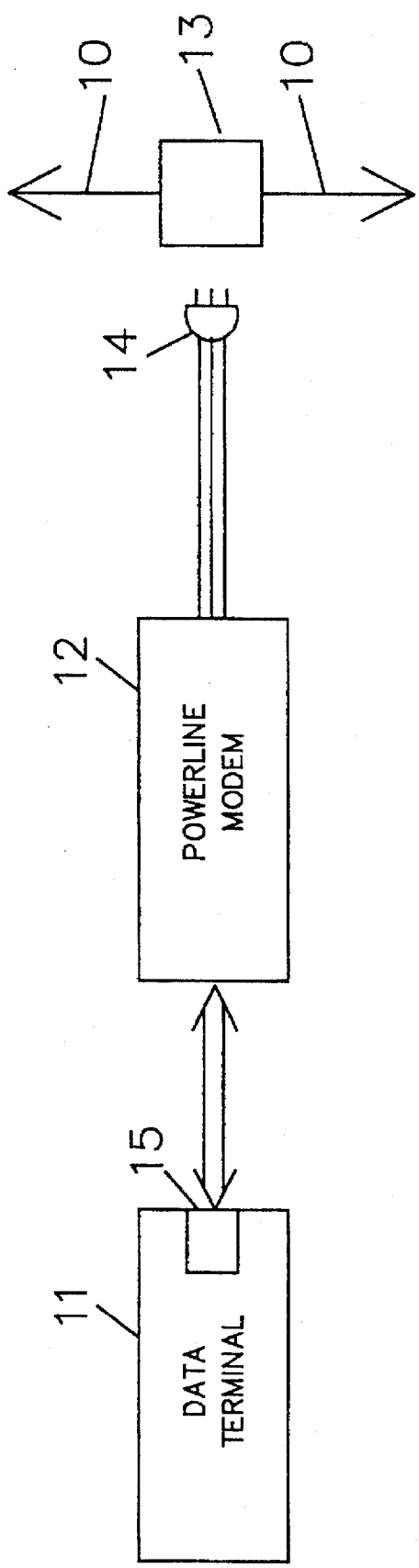
FIG. _ 1

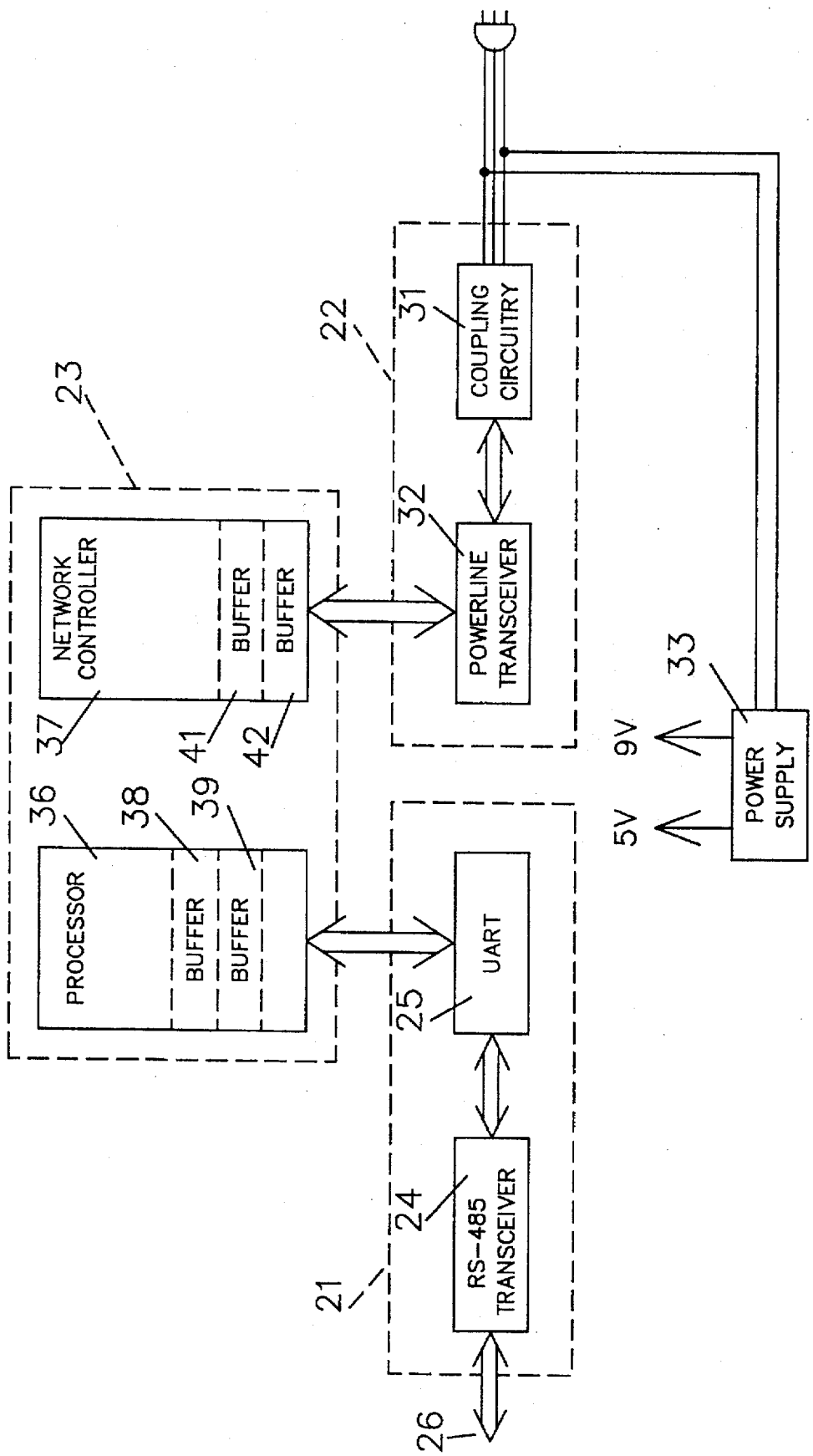
FIG._2

RS-485 MULTIPOINT POWER LINE MODEM

BACKGROUND OF THE INVENTION

The present invention relates generally to interfaces for establishing data networks and in particular to interfaces for establishing network connections over power lines.

A data network is a system of devices linked together so as to permit individual devices to exchange data with one or more other devices on the network. "Data network" is used herein in a broad sense to encompass not only computer networks including a number of computers, printers, or other peripheral equipment linked together, but also more general data networks linking together automated control and monitoring equipment, telemetering devices, alarm devices, or even magnetic stripe readers such as used in retail stores to read credit cards and debit cards.

Historically the devices of a network have been linked together by dedicated wiring. Dedicated wiring, however, has a number of recognized limitations and drawbacks, including the high cost, delay, inconvenience and in some circumstances complexities of installation in existing buildings, and once installed, the cost and inconvenience of expanding or reconfiguring the system. In great measure due to the high cost and inflexibility of dedicated wiring, alternative approaches have emerged using wireless radio-frequency and infrared transmissions and using the AC power lines as the network communications medium.

In power line data communications the transmitted data is piggybacked onto an existing power line in addition to the electrical AC line current already present for delivering electrical power. Using the power line as the medium for communications is particularly convenient because a power line will always be present to provide power to the various nodes of the network, and this avoids the need to retrofit the work area with dedicated wiring. The power line, however, presents an extremely hostile electrical environment for data communications because of power surges and noise spikes on the line as well as unpredictable variations in line impedance as devices are plugged into and unplugged from the line. Nevertheless, special communications protocols have been developed, and integrated-circuit chip sets employing them are commercially available, to make the AC power line a feasible network communications medium.

Network devices that initiate or receive messages are generally referred to as data terminal equipment or DTEs for short. DTEs typically connect to communications equipment through one of several standard forms of electrical interfaces. One such electrical connection standard is the Electronic Industries Association RS-485 standard. This standard provides for multi-point communications, in which many points, that is, devices, can communicate with one another or with a central controller. Notwithstanding the availability of communications protocols able to function in the noisy power line environment, RS-485 communications over power lines have not generally been available.

SUMMARY OF THE INVENTION

The present invention provides a power line modem enabling multi-point networks emulating the RS-485 standard to be established over power lines. Briefly, the modem includes a data terminal interface unit that sends and receives serial RS-485 data streams to and from a data terminal at a first nominal data rate; a power line interface unit that sends and receives data to and from a power line at a second nominal data rate; and a parallel I/O interface connecting the data terminal interface unit and the power line unit. The parallel I/O interface includes a network processor implementing a network protocol for sending and receiving messages over the power line through the power line interface unit. The parallel I/O interface provides for very fast data transfers across the parallel I/O interface at an internal transfer rate substantially greater than the first and second nominal data rates. Moreover, at least for outgoing data transfers from the data terminal to the power line, data is transferred across the parallel I/O interface in a form intermediate between the serial RS-485 data stream from the data terminal and the message packet that is formed by the network processor and sent out over the power line. The intermediate form facilitates reliable and flexible transfers compensating for delays and uncertainties in the transmission rate over the power line.

A number of data terminals, each coupled to a power line with the present modem, can communicate with one another as if over an RS-485 communications medium. The present power line modem supports all the protocols for the RS-485 interface inherent in any data terminal to which it is connected. The modem's operations are thus transparent to the data terminal, which is not aware that its data travels to other data terminals over the power line in something other than an RS-485 environment.

The present invention overcomes a limitation of the conventional RS-485 interface through dedicated wires in that the electrical features of the conventional interface generally only permit a fixed maximum number of DTEs, generally 32 or in some configurations 64, to be connected to one wire, whereas with the present invention any number of DTEs may be connected.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is an overall block diagram showing a power line modem coupling a representative network device to a power line.

FIG. 2 is a functional block diagram showing an embodiment of the power line modem of FIG. 1.

DETAILED DESCRIPTION OF ILLUSTRATIVE EMBODIMENTS

FIG. 1 shows a power line 10 such as commonly found in commercial, industrial or residential buildings. Power line 10 may also be provided, for example, by a system of temporary power lines or extension cords such as might be set up at a trade show or exhibition for supplying electrical power to a number of computers, printers, credit card readers, or other DTE devices to be coupled to form a data network. The individual DTE devices to be linked together are referred to herein generically as data terminals without regard to the specific functions of the devices because the present invention views all such devices merely as the source or destination of a data stream, without regard to whether the device is, for example, a computer, magnetic stripe reader, automated control device or telemetering device. FIG. 1 shows a diagrammatic data terminal 11 coupled to power line 10 through a power line modem 12. The embodiment of modem 12 illustrated in FIG. 1 connects to the power line by means of a conventional plug 13 and outlet box 14. The particular manner in which the modem is connected to the power line is not important to the invention just so long as the data signal is able to pass between the modem and the power line. Data terminal 11 is equipped with a standard RS-485 data port 15 for providing or receiving a serial data stream when the data terminal is in transmitting or receiving mode. It is intended that other data terminals desiring to communicate with data terminal 11 will also be connected through a like modem 12 to the same power line.

FIG. 2 shows a functional block diagram of an embodiment of modem 12, including a data terminal interface unit 21 for connecting to and exchanging data with data terminal 11, a power line interface unit 22 for connecting to and exchanging data with power line 10, and a parallel I/O interface 23 coupling the data terminal interface and power line interface units 21 and 22.

Data terminal interface unit 21 includes an RS-485 transceiver 24, which is adapted for connection to data terminal 11, for example, through a conventional RJ-11 connector. Connected to RS-485 transceiver 24 is a universal asynchronous receiver-transmitter (UART) 25. A serial RS-485 data stream from port 15 of data terminal 11 enters data terminal interface unit 21 along line 26 and is applied to RS-485 transceiver 24, which puts the data stream in a form acceptable by UART 25. UART 25 transforms the serial RS-485 stream into a parallel data stream and puts it into a microprocessor-readable form for subsequent processing by parallel I/O interface 23. The operation of RS-485 transceivers and UARTs is well known, and integrated-circuit chips for implementing them are commercially available. For example, in the illustrated embodiment RS-485 transceiver 24 was provided by an SN75176bn transceiver from Texas Instruments. Accordingly these units need not be described in detail here.

Power line interface unit 22 includes coupling circuitry 31 for exchanging a data signal with power line 10. Coupling circuitry 31 is connected to power line transceiver 32 for placing the signal in a form for exchange with parallel I/O interface 23. In the illustrated embodiment power line transceiver 32 was provided by a model PLT-10A power line transceiver from Echelon Corporation of Palo Alto, Calif. Power line transceivers and coupling circuitry are well known from other methods for communicating data over power lines and thus need not be described in detail here.

Modem 12 also includes conventional power supply circuitry 33 deriving electrical power from power line 10 and providing a low-voltage supply for use onboard modem 12. The particular power supply used in the illustrated embodiment was a low-noise power providing 9 volt and 5 volt sources available from Power Integrations, Inc. of Sunnyvale, Calif. Although illustrated here with a power supply deriving power from the power line, the modem may alternatively be configured with a battery supply serving either as a backup supply or as the sole source of power for the modem. With a battery supply the modem may be used to connect data terminals in a multi-point network over an unpowered power line. That is, apart from providing a low voltage supply the modem does not require the presence of power on the line 10 to establish data communications.

Data terminal 11 communicates with data terminal interface unit 21 through serial RS-485 data port 15 at a fixed nominal rate determined within data terminal 11. This rate will generally be within the range of 300 to 9600 bits per second (bps) and is commonly equal 9600 bps. Power line interface unit 22, on the other hand, places data on power line 10 and receives data from the power line at a speed that is determined by the electrical environment of the power line and the capabilities of power line transceiver 32. In the illustrated embodiment power line transceiver 32 was able to transfer data at a maximum line speed of 10 kilobits per second (kbps). A data signal is commonly communicated to or from the power line in data packets at an unsteady rate subject to delays and interruptions. Parallel I/O interface 23 establishes a reliable data exchange between data terminal interface unit 21 and power line interface unit 22. Interface 23 transforms the data irregularly received from the power line and provided by power line transceiver 32 into a form for transfer to data terminal 11 at the fixed rate expected by the data terminal. Parallel I/O interface 23 also prepares and stages data signals received from data terminal 11 for transfer to the power line and provides for interrupting that transfer whenever incoming data signals identifying data terminal 11 as their destination are received over the power line. Interface 23 includes a processor 36 that controls the operation of data terminal interface unit 21 and manages data sent directly to or received directly from the data terminal interface unit. In the implementation described herein processor 36 is provided by an 8051 microprocessor chip. Network communications are established and managed by a network microcontroller 37, sometimes referred to as a network processor, which in the present implementation is provided by a Neuron 3150 chip specifically designed for implementing local operational networks and available from Echelon Corporation of Palo Alto, Calif. This chip implements a token-passing scheme for network communications, oversees the formation of data packets from data streams, performs addressing functions for multipoint network communications, and controls the transmission and reception of data packets over the communications medium, which in this case is the power line.

The operation of the data terminal interface unit and the power line interface unit is governed by software residing in the 8051 microprocessor 36 and in network microcontroller 37. Data is transferred through parallel I/O interface 23 in two directions. Transfers from data terminal 11 to power line 10 are referred to as outgoing data transfers, and transfers in the opposite direction are referred to as incoming data transfers. To assist in passing data back and forth in the two directions, processor 36 defines a pair of FIFO buffers 38 and 39 and microcontroller 37 defines a pair of FIFO buffers 41 and 42. In the implementation described herein, buffers 38 and 39 are defined as virtual buffers occupying the same physical buffer within the 8051 microprocessor. Unlike the counterpart buffers 38 and 39, the buffers 41 and 42 need not be implemented as virtual buffers for reasons which will become apparent from the discussion below.

The software for data terminal interface unit 21, residing in processor 36, will now be described. The data terminal interface software provides the following functions. It governs the receipt of serial RS-485 data streams from data terminal 11 and the outgoing transfer of parallel data streams to network microcontroller 37. It also governs the flow of data in the opposite direction, i.e., the receipt of incoming parallel data streams from network microcontroller 37 and the transfer of serial RS-485 data streams to data terminal 11. It also provides for synchronization between processor 36 and network microcontroller 37 to maintain proper operation of parallel I/O interface 23.

The data terminal interface software begins by executing a power-on initialization sequence and then continually executes a main loop that looks for a data stream coming from either side, that is, coming from data terminal 11 or from power line interface unit 22. The main loop operates as follows. For the sake of illustration, assume that the loop first detects a data stream coming from data terminal 11.

When the loop detects a data stream, it puts the first incoming byte into FIFO buffer 38 for later movement to power line interface unit 22. The loop then executes a synchronization sequence, in which it determines whether the byte can be sent to the power line interface unit 22, that is, whether the power line interface unit is in a state in which it can accept data. If so, then the byte is sent to the power line interface unit. If it turns out that power line interface unit 22 is not able to accept the data because it also has a data byte waiting that was received from power line 10, then the byte from the power line interface unit 22 is given precedence. Processor 36 executes a sequence of commands to receive the waiting data byte from power line interface unit 22 and send it on to data terminal interface unit 21. When processor 36 has received and processed the byte from power line interface unit 22, it makes another attempt to send the byte from the data terminal interface unit 21. Pseudocode for the data terminal software main loop is given in Table I.

TABLE I

```
Do Forever                                              // infinite loop
{
    IF (a byte came from data terminal interface unit 21) THEN
        Put the byte into FIFO buffer 38
    IF (re-synchronization is required) THEN
        Execute the synchronization sequence
    IF (processor 36 owns the write token) THEN
        IF (FIFO buffer 38 is not empty) THEN
            Send the data from FIFO buffer 38 to microcontroller 37
            The write token is now owned by microcontroller 37
        ELSE IF (no activity on parallel I/O interface 23 for specified
            time) THEN
            Execute the synchronization sequence
        ELSE
            Pass the write token to microcontroller 37
    ELSE
        Try to read data coming from power line interface unit 22
        IF (power line interface unit 22 sent data) THEN
            Send the data to data terminal interface unit 21
            The write token is now owned by processor 36
}
```

A description is now given of the buffering of data in processor 36. Data traveling through this processor is temporarily stored in two FIFO buffers: a 485-to-Power Line (abbreviated "PL") buffer 38 for outgoing data coming from RS-485 transceiver 24 and going to power line interface unit 22, and a PL-to-485 buffer 39 for incoming data coming from power line interface unit 22 and going to RS-485 transceiver 24. Since the data cannot travel over processor 36 in both directions at the same time, these FIFO buffers are implemented as virtual buffers sharing the same physical data buffer. For the 8051 microprocessor used in the illustrated embodiment, this configuration has the advantage that the data can be made to fit in the existing 128-byte RAM on board the 8051 microprocessor avoiding the need for external RAM. Those skilled in the art given the benefit of this disclosure will recognize that other RAM and buffer configurations may be employed as appropriate and customary with other microprocessors.

The buffers are defined by the following parameters: the start of the data buffer (character pointer); the maximum length of the FIFO (length of the data buffer); an index into the buffer indicating where to put the next byte (In-index); an index into the buffer indicating from where to take the next byte (Out-index); and the count of the bytes in the buffer. To put a byte into a FIFO buffer, if the buffer is not full, write the byte to the position indicated by the In-index and increment the In-index. If the In-index reaches the end of the buffer, wrap it to the start of the buffer. Finally, increment the byte count. To get a byte from a buffer, if the buffer is not empty, read a byte from the position indicated by the Out-index and increment the Out-index. If the Out-index reaches the end of the buffer, wrap it to the start of the buffer. Finally, decrement the byte count.

The RS-485 serial interface controlled by processor 36 is interrupt driven. Pseudocode for the serial Interrupt Service Routine is given in Table II.

TABLE II

```
IF (interrupt from UART 25 is a Receive interrupt)
    Get the received character
    IF (FIFO 38 is not full)
        Store the character in the FIFO
    ELSE                                    // FIFO is full
        Ignore the byte
ELSE
    IF (FIFO 39 is not empty)    // a byte waits to be sent to
                                 //data terminal interface unit 21
        Get the byte from FIFO 39
        Send the byte
    ELSE
        Set the prime flag
```

A description is now given of the Receive sequence in processor 36. When a byte comes from RS-485 transceiver 24, UART 25 generates a Receive interrupt. The Interrupt Service Routine (Table II) gets the byte just received and stores it in the 485-to-PL FIFO buffer 38. If buffer 38 is full, the incoming byte gets lost. The whole Receive sequence is executed on the interrupt level. At the "upper" applications software level processor 36 is aware of the data coming from RS-485 transceiver 24 by examining the byte count in FIFO buffer 38. The software upper level is responsible for getting the data out of buffer 38 and sending it to network microcontroller 37 where it is placed in a Parallel-to-PL buffer 41. In normal operation there will be sufficient time for the data to be transferred to network microcontroller 37 before FIFO buffer 38 gets full.

The data flow from RS-485 transceiver 24 to power line interface unit 22 will now be described. When data starts arriving from RS-485 transceiver 24, the Serial Interrupt Service Routine feeds it to the 485-to-PL FIFO buffer 38. When processor 36 owns the token, the processor checks whether buffer 38 is empty. If it is not empty, the processor forms a packet to be sent to network microcontroller 37. The first byte of the packet represents the count of data, so the packet can contain only the data which was already in FIFO buffer 38 when the process was started. The Serial Interrupt Service Routine continues feeding FIFO buffer 38 so that even after a packet is sent, the byte count in buffer 38 may nevertheless be nonzero. The remaining bytes giving rise to the nonzero byte count will be incorporated into the next packet. While processor 36 is forming a packet and transmitting the packet to network microcontroller 37, a serial interrupt must be enabled so that the processes of feeding and emptying 485-to-PL buffer 38 can both go on simultaneously.

Outgoing data transfers from data terminal 11 to power line 10 are subject to interruptions and unpredictable fluctuations in transfer rates across parallel I/O interface 23 due to such factors as the amount of data traffic on the power line, the electrical noise conditions on the power line, and the changing line impedance when loads are connected to and disconnected from the power line. To circumvent this problem, data is transferred between processor 36 and network microprocessor 37 at a data rate, referred to herein as the internal transfer rate, that is substantially greater than the greater of the nominal data transfer rates at data terminal 11 and at power line 10. In the implementation illustrated here the maximum internal transfer rate established by processor 36 and network processor 37 is a line speed of 1.2 Megabits per second. This maximum internal transfer rate provides sufficient headroom to tolerate the delays and fluctuations normally encountered on a power line. As data transmission rates at the data terminal and over the power line improve, the size of the requisite gap between the internal transfer rate across parallel I/O interface 23 and the nominal data terminal and power line data rates may be established either empirically by merely selecting an internal transfer rate high enough to avoid traffic jams at parallel I/O interface 23 or theoretically by calculating the expected delays in a worst case for given electrical conditions and data traffic on the power line.

The present power line modem also deals with the variable and uncertain data transfer rate over the power line by the manner in which data bytes are transferred across parallel I/O interface 23. When data is being transferred to network microcontroller 37, the bytes are being continuously fed into and read from buffer 38. At a prescribed time when network controller 37 is ready to receive data from processor 36, processor 36 looks at the count of bytes in buffer 38 and transfers that number of bytes as a single packet to buffer 41 of network processor 37 even though more bytes may be streaming into buffer 38. This packet is not the final packet that will be sent over the power line, but is an intermediate packet. Network processor 37 retrieves the intermediate packet from buffer 41 and adds overhead information for routing over the network to form a message packet that wild be sent out over the power line. In the meantime when network processor 37 retrieves the intermediate packet from buffer 41, the buffer is immediately free to receive another intermediate packet from processor 36. In the embodiment illustrated here the prescribed time at which a data packet is transferred from buffer 38 to buffer 41 is the time when processor 36 receives a signal that buffer 41 is empty. While this is a convenient signal for transferring data in the present embodiment, those skilled in the art will appreciate that a different time may be prescribed for transferring the data as appropriate to other implementations.

The number of data bytes in each packet transferred from buffer 38 to buffer 41 will vary depending on the instantaneous rate that data is fed into buffer 38 and the instantaneous rate that data is placed on power line 10. Since the buffers 38 and 39 are virtual buffers, their length at any given time is defined by the respective byte count. Thus, the buffers 38 and 39 may be considered to have a variable length, which is adjustable under control of the software in response to the speed of communications with power line interface unit 22, that is, in response to the speed of communications with power line 10. The variable length buffers allow processor 36 to transfer the data reliably and efficiently notwithstanding the uncertainty in data packet arrival times and rates from the power line.

When processor 36 does not own the token, the processor checks whether power line interface unit 22 has data to send. If power line interface unit 22 wants to send data, processor 36 receives a packet from network microcontroller 37. After receiving the packet, processor 36 sends the data to RS-485 transceiver 24. The first byte goes directly to a hardware register and the rest go to PL-to-485 buffer 39. This is handled by the Transmit sequence.

The Transmit sequence proceeds as follows. When UART 25 finishes transmitting an incoming byte to data terminal 11 over RS-485 transceiver 24, it generates a Transmit interrupt handled by the Interrupt Service Routine (Table II). The Transmit sequence verifies whether all bytes in PL-to-485 FIFO buffer 39 have been sent. If buffer 39 is not empty, the next byte in the buffer is transmitted. If the buffer is empty, the Interrupt Service Routine sets the prime flag. This indicates that PL-to-485 buffer 39 is empty and no transmitting is in progress. The control language for processor 36 will include an "upper level" function responsible for moving data bytes. The prime flag is introduced to notify that function what to do with the byte to be transmitted over RS-485 transceiver 24. If the prime flag is set, the byte will be written directly to a hardware register for transmission and the flag will be reset; otherwise the byte will be added to PL-to-485 FIFO buffer 39.

Two processes are going on simultaneously: on the upper level, bytes are being fed to PL-to-485 buffer 39, and the Serial Interrupt Service Routine is getting the bytes from buffer 39 and sending them to RS-485 transceiver 24. If buffer 39 becomes full, no fatal error occurs. Since the Interrupt Service Routine continues to take bytes from buffer 39, some room in the buffer will eventually be freed so that on the upper level the software merely waits.

Two other sequences mentioned above that are executed by processor 36 are the power-on sequence and the synchronization sequence. When the unit is first powered up, the FIFO buffers are empty. The power-on sequence initialize the buffers by setting all indexes and counts to zero, sets the prime flag, and initialize the serial interface by setting the baud rate at a prescribed value.

For parallel I/O interface 23 to operate properly, processor 36, functioning as a master processor, must be synchronized with network microcontroller 37, functioning as a slave processor. The appropriate synchronization steps for any given processors are part of a routine protocol for the given processors and need not be set out in detail here. Processor 36 can initiate the synchronization sequence whenever it owns the write token. In particular, processor 36 executes the synchronization sequence at the following times: On reset, to establish the initial connection between data terminal interface unit 21 16 and power line interface unit 22; whenever data transfer across parallel I/O interface 23 fails, such as when handshaking times out or when an error is detected; and every ten seconds while parallel I/O interface 23 is idle.

The software for power line interface unit 22 will now be described. Briefly, the power line interface software provides the following functions. It receives outgoing data from processor 36 and sends it on to power line 10, and it receives incoming data from power line 10 and sends it on to processor 36.

The main loop of the power line interface software is parallel to the main loop described above for the data terminal interface software. Pseudocode for the power line interface main loop is given in Table III.

TABLE III

```
Do forever                                              // infinite loop
{
    IF (data came from processor 36) THEN
        IF (parallel-to-PL FIFO buffer 41 has sufficient room)
            Get the data
            Put the data into parallel-to-PL FIFO buffer 41
    IF (data came from power line 10) THEN
        Put the data into the PL-to-parallel FIFO buffer 42
    IF (Parallel I/O interface 23 is idle AND PL-to-parallel FIFO buffer
        42 is not empty) THEN
```

TABLE III-continued

```
Send data to processor 36
IF (parallel-to-PL FIFO buffer 41 is not empty) THEN
    Send the data over power line 10
}
```

The data traveling over network microcontroller 37 is temporarily stored in two FIFO buffers: Parallel-to-PL buffer 41 for outgoing data coming from processor 36 and going to power line 10, and a PL-to-Parallel buffer 42 for incoming data coming from power line 10 and going to processor 36. Since the data cannot travel over network microcontroller 37 in both directions at the same time, both of these buffers may share the same physical data buffer implemented in microcontroller 41.

The network microcontroller FIFO buffers are organized differently from the FIFO buffers associated with processor 36. Each network microcontroller FIFO buffer is defined by the following parameters: the start of the data buffer (character pointer); the maximum length of the FIFO (length of the data buffer); and an index into the buffer indicating where to put the next byte (In-index). The In-index also serves as the count of the bytes in the FIFO. Since the network microcontroller performs all data manipulations on one level, rather than on the interrupt level, which is not available to the power line interface software, the FIFO buffers 41 and 42 cannot be fed and emptied simultaneously. The first byte in a FIFO is always the next one to be taken from the FIFO. After a portion of the bytes are retrieved from the FIFO, the rest of the data is moved to the beginning, and the In-index again becomes equal to the byte count in the FIFO. This scheme does not require wrapping as used in the FIFO buffers of processor 36. Unlike the approach used in processor 36, data bytes are moved here by a standard memory copy function memcpy().

At this point little has been said about the nature of the data that is sent back and forth over power line 10 to other devices on the power line network. Each such device will be connected to power line 10 by a power line modem 12 containing a network microcontroller 41. The processors in the respective power line modems 12 talk to one another by exchanging data units referred to as "messages." A message contains the substantive content-bearing data, the count of that data, and addressing and routing information. A portion of the addressing information may include a domain address identifying a particular network of devices connected to power line 10. The use of domain addressing makes it possible to connect more than one network to the same power line and maintain the separate identities of the multiple networks. Such domain addressing is implemented in the network microcontrollers 41. Messages are broadcast over power line 10 and are delivered to those modems 12 with the same domain address. The detailed manipulation of messages is handled by the network microcontroller. Communications software governing these functions is provided by the microcontroller supplier and is well known to those skilled in network communications and need not be described in any detail here. The network communications software typically will include functions for forming the message structure containing substantive data and header information and for passing the message structure to the lower, network layer for future broadcasting. The network layer is not accessible to the application software described herein for controlling power line interface unit 22, but the network communications software notifies the application software when a message has successfully reached the network level so that the preparation of the next message can start. Within the power line interface software described herein, the process of receiving a message begins when the network layer gives notification that there is a message to be received. The power line interface software then retrieves the message, its data is copied to the local buffers, and the network layer is notified that it may accept the next message.

A description is now given of the data flow in network microcontroller 37 and power line interface unit 22. Within this unit data is transferred in packets rather than by bytes. Even the transfer of a single byte is treated as a packet transfer with the packet length transmitted separately. In the typical operation, when data arrives from data terminal interface unit 21 through processor 36, the arriving packet is accepted and the data is put into Parallel-to-PL FIFO 41. The buffer is now no longer empty, and the network communications software automatically forms an outgoing message from the FIFO contents and sends it on to power line transceiver 32 to be placed on power line 10. In the network communications microcontroller used in the embodiment illustrated here, communications over the network and packet manipulations by the microcontroller messaging software are both out of the scope of the power line interface software, and these communications can proceed simultaneously. The power line interface software is notified when a packet arrives from processor 36 and determines whether to accept the packet immediately or to wait. The power line software will wait if there is no room in the FIFO buffer because the previous data has not yet been sent over the network. When an outgoing message is formed, the outgoing message may not necessarily incorporate all the data in the Parallel-to-PL FIFO buffer 41 because of a size limitation. In this event immediately after the outgoing message is sent, the FIFO will still not be empty. The next outgoing message cannot be sent, however, until the power line interface block software receives a notification that the previous outgoing message successfully reached the network layer. The software will thus occasionally have to wait momentarily before it is able to accept an arriving packet from processor 36.

In the other direction, when a message arrives from power line 10, the power line interface software accepts the message and puts the data into PL-to-Parallel FIFO buffer 42. The buffer is now no longer empty, and the network communications software automatically sends a request to processor 36. When processor 36 is ready for receiving the data, a packet is formed and the data is sent on to processor 36. The above descriptions and drawings disclose an illustrative embodiment of the invention. Given the benefit of this disclosure, those skilled in the art will appreciate that various modifications, alternate constructions, and equivalents may also be employed to achieve the advantages of the invention. For example, the modem may be implemented with other processors besides the 8051 microcontroller and Echelon network microcontroller disclosed here. The invention therefore is not to be limited to the embodiment described and illustrated here, but is defined by the following claims.

What is claimed is:

1. Apparatus for interfacing a plurality of data terminals over a power line for the exchange of data, said data terminals sending and receiving data according to the RS-485 electrical interface standard, comprising:

a data terminal interface portion for receiving and sending a serial RS-485 data stream from and to a first of said data terminals at a first nominal data rate, said serial RS-485 data stream comprising a plurality of data bytes;

a power line interface portion for receiving data from and sending data to said power line at a second nominal data rate; and a parallel I/O interface connecting said data terminal interface portion with said power line interface portion for communicating data back and forth therebetween;

wherein said parallel I/O interface comprises:

a network processor implementing a network protocol for sending and receiving messages over said power line through said power line interface portion;

outgoing data transfer means for transferring said plurality of data bytes from said data terminal interface portion to said network processor in an intermediate form at an internal transfer rate substantially greater than said first and second nominal data rates for inclusion in an outgoing message to be passed to said power line interface portion; and incoming data transfer means for transferring the data in an incoming message received from said power line interface portion to said data terminal interface portion at said internal transfer rate to be passed to said first data terminal as an RS-485 data stream;

whereby said apparatus emulates an RS-485 communications environment for said plurality of data terminals.

2. The apparatus of claim 1 wherein said intermediate form comprises at least one intermediate data packet.

3. The apparatus of claim 1 wherein said outgoing data transfer means and said incoming data transfer means each includes a virtual data buffer having a length in bytes that is variable in response to variations in the speed of communications on the power line.

4. A method of interfacing a plurality of data terminals over a power line for the exchange of data, said data terminals sending and receiving data according to the RS-485 electrical interface standard, comprising the steps of:

providing a network processor implementing a network protocol for sending and receiving messages over said power line, said messages being sent and received over said power line at a first nominal data rate;

receiving a serial RS-485 data stream from a first of said data terminals at a second nominal data rate;

converting said serial RS-485 data stream to a parallel data stream;

feeding said parallel data stream to a first buffer;

forming a first packet from the data in said first buffer as of a prescribed time;

transferring said first packet to a second buffer at a rate substantially greater than said first and second nominal data rates while continuing to feed said parallel data stream to said first buffer;

retrieving said first packet from said second buffer and forming a second packet therefrom, said second packet including data from said first packet and additional network routing data;

transmitting said second packet over said power line according to the protocol of said network processor to at least one other of said data terminals; and successively repeating said steps of forming a first packet, transferring said first packet, retrieving said first packet and forming said second packet, and transmitting said second packet until all of said serial RS-485 data stream has been transmitted.

5. The method of claim 4 wherein said prescribed time for forming said first packet corresponds to a time when said second buffer is empty.

6. The method of claim 4 wherein said parallel data stream is composed of a plurality of data bytes, and said method further comprises the steps of:

keeping count of the number of bytes in said first buffer; and forming said first packet from the earliest bytes in said first buffer equal in number to said count at said prescribed time while continuing to feed said parallel data stream to said first buffer.

* * * * *